(12) United States Patent
Kanzler et al.

(10) Patent No.: US 9,630,387 B2
(45) Date of Patent: Apr. 25, 2017

(54) PROCESS FOR CONTINUOUS INLINE PRODUCTION OF COATED POLYMERIC SUBSTRATES OR LAMINATES

(75) Inventors: Waldemar Kanzler, Bietigheim-Bissingen (DE); Thomas Hasskerl, Kronberg (DE); Ghirmay Seyoum, Egelsbach (DE); Patrick Kliem, Otzberg-Lengfeld (DE); Werner Krebs, Eich (DE); Dieter Foerster, Gross-Umstadt (DE); Manfred Dannehl, Kahl am Main (DE)

(73) Assignee: Evonik Roehm GmbH, Darmstadt (DE)

(*) Notice: Subject to any disclaimer, the term of this patent is extended or adjusted under 35 U.S.C. 154(b) by 591 days.

(21) Appl. No.: 14/126,693

(22) PCT Filed: Jun. 15, 2012

(86) PCT No.: PCT/EP2012/061388
§ 371 (c)(1),
(2), (4) Date: Dec. 16, 2013

(87) PCT Pub. No.: WO2012/172032
PCT Pub. Date: Dec. 20, 2012

(65) Prior Publication Data
US 2014/0106148 A1    Apr. 17, 2014

(30) Foreign Application Priority Data
Jun. 16, 2011 (DE) ................ 10 2011 077 612

(51) Int. Cl.
*B32B 7/12* (2006.01)
*B32B 37/12* (2006.01)
(Continued)

(52) U.S. Cl.
CPC ........... *B32B 37/1284* (2013.01); *B32B 7/12* (2013.01); *C08F 2/48* (2013.01); *C08J 7/047* (2013.01);
(Continued)

(58) Field of Classification Search
CPC ............................. B32B 7/12; B32B 37/1284
See application file for complete search history.

(56) References Cited

U.S. PATENT DOCUMENTS 3,765,983 A * 10/1973 Putzier ............... B29C 65/4895
15/104.03
4,234,399 A    11/1980 McDowell et al.
(Continued)

FOREIGN PATENT DOCUMENTS

DE    WO 2011012294 A1 * 2/2011 ............... B05D 7/04
EP    0 100 688        2/1984
(Continued)

OTHER PUBLICATIONS

International Search Report Issued Jul. 23, 2012 in PCT/EP12/061388 Filed Jun. 15, 2012.

*Primary Examiner* — Daniel McNally
(74) *Attorney, Agent, or Firm* — Oblon, McClelland, Maier & Neustadt, L.L.P.

(57) ABSTRACT

The present invention relates to a method for the continuous inline production of coated polymeric substrates or laminates and also to an apparatus for implementing this method.

14 Claims, 3 Drawing Sheets

(51) Int. Cl.
*C08F 2/48* (2006.01)
*C08J 7/04* (2006.01)

(52) U.S. Cl.
CPC .. *Y10T 428/2495* (2015.01); *Y10T 428/31507* (2015.04); *Y10T 428/31935* (2015.04)

(56) References Cited

U.S. PATENT DOCUMENTS

| | | |
|---|---|---|
| 4,526,920 A | 7/1985 | Sakashita et al. |
| 2004/0142115 A1 | 7/2004 | Jaworek et al. |
| 2005/0003093 A1 | 1/2005 | Hesselmans et al. |
| 2007/0243387 A1* | 10/2007 | Lin ............... C08J 5/12 428/420 |
| 2012/0121920 A1* | 5/2012 | Kuhlmann ......... B29C 47/0019 428/521 |

FOREIGN PATENT DOCUMENTS

| | | | |
|---|---|---|---|
| EP | 0 331 087 | 9/1989 | |
| EP | 0 551 693 | 7/1993 | |
| JP | EP 0331087 A2 * | 9/1989 | ............ C08J 7/047 |
| JP | 2004 130540 | 4/2004 | |
| WO | 02 053298 | 7/2002 | |
| WO | 03 018661 | 3/2003 | |
| WO | WO 2011/012294 A1 | 2/2011 | |

* cited by examiner

PROCESS FOR CONTINUOUS INLINE PRODUCTION OF COATED POLYMERIC SUBSTRATES OR LAMINATES

FIELD OF THE INVENTION

The present invention relates to a method for the continuous inline production of coated polymeric substrates or laminates and also to an apparatus for implementing this method.

PRIOR ART

Substrates in web form such as sheets or films, for example, have for a long time been produced in continuous processes, such as by extrusion of plastics moulding compositions, for example, and in order to obtain high-grade surfaces have been furnished with functional outer layers. Functional surfaces can be generated for example via coextrusion of suitable thermoplastic moulding compositions or by means of coating. In the case of coating, inline methods using radiation-curable, solvent-free systems have become established, since these systems are environment-friendly at the same time as saving on energy, costs, time and space. Among the radiation-curable methods, the UV curing of radically polymerizable coating materials is particularly widespread, since relative to other methods such as electron beam curing, for example, it offers advantages in terms of capital investment, cost and space. In order to obtain high-grade, weathering-resistant surfaces, it is advantageous to keep elemental oxygen, from the air, away from the uncured surface of the coating material, and to cure the coating material under inertization, for example. Inertization, however, implies a costly construction effort, an additional space requirement and a sustained consumption of gases for inertization. Consequently, methods have been developed for providing shielding from atmospheric oxygen by lining of the uncured surface of the coating material with a suitable liner material.

EP-A-0 331 087 (Mitsubishi Rayon) describes a method for the continuous coating of a substrate with a UV-curable coating material, where the uncured coating material is lined with a film and cured by means of UV rays. The coating material can be admixed with UV absorbers when the photoinitiator for radiation curing is sensitive in the wavelength range between 360 and 400 nm. A disadvantage of the outer layers obtained, however, is their relatively low adhesion, and there are also a relatively large number of defects visible.

JP-A-2004-130540 (Mitsubishi Gas) describes a method in which a UV-curable coating material is applied to a polycarbonate substrate, the uncured coating is lined with a film and the uncured coating is cured by means of UV radiation through the film. According to the teaching of this publication, the temperature of the surface to be coated must be in the range from 70 to 120° C. The viscosity of the coating material is preferably between 12 and 120 mPa*s and the thickness of the coating is preferably in the range from 1 to 15 μm. With these parameters, effective adhesion of the coating on the polycarbonate is obtained. Lining takes place using films of polyester or of triacetate. Pressure is applied using rollers, rolls, brushes or doctor blades (spatulas) to bring about uniform distribution of the coating material.

The publication JP-A-2004-130540 teaches that increased substrate temperatures lead to an improvement in the strength of adhesion of the outer layer to the substrate, but the elevated temperature is disadvantageous for the detachment of the liner film after the curing procedure. Often an inseparable laminate is obtained or line-form disruptions come about during detachment of the film.

A further disadvantage of the increased substrate temperature lies in premature detachment of the film from the coated substrate, which may occur more particularly before the curing of the coating material. By rapid curing of the coating material immediately after lamination it is possible to prevent the detachment. This procedure, however, is costly and inconvenient and may have adverse consequences for the adhesion, which comes about as a result of the incipient swelling of the substrate.

The incipient swelling or incipient dissolution of a plastics substrate is favourable for the adhesion between substrate and coating material and is supported or rather accelerated by means, for example, of elevated temperatures or a longer exposure time of the uncured coating material. In the case of a highly elevated substrate temperature, however, there may be unwanted changes in the surface quality, which become visible, for example, through clouding of the substrate surface, more particularly of a plastics surface, if the exposure time of the uncured coating material is too long.

In JP-A-2004-130540 it is said that polycarbonate loses its impact toughness when it is incipiently swollen excessively, which is the reason for using a specific, solvent-free coating formulation mandatorily comprising 1,9-nonanediol diacrylate as a component. Through the use of 20-60 parts of 1,9-nonanediol diacrylate as a component of the coating material, success is achieved in limiting the incipient swelling. A further measure for confining the incipient swelling is the curing immediately after the compressing of film and substrate sheet just 12 cm after the laminating device.

Substrates which are coated by this method, with a short incipient swelling time, do exhibit good initial adhesion, but lose adhesion completely after 1000 h of weathering in the Xenotest in accordance with DIN EN ISO 4892-2.

JP7-74282B cites cooling almost to room temperature as a measure for avoiding incipient substrate swelling. In the case of inline coating, this measure entails a long cooling section in an extrusion line and a correspondingly long residence time. With this method there is no mixed phase formed between substrate polymer and coating material, with deleterious consequences for the long-term adhesion, since the stress level in the composite is very high.

DE69222140T2 (EP 551 693 B1) describes a method for heating a polycarbonate film, coated with a UV-curable coating material, in order to cause diffusion of coating material components into the top substrate layer to promote adhesion. The wet coated film is brought by subsequent heating, following the coating operation, to a temperature of between 32° C. and 66° C. and is cured using UV radiation. The disadvantage of this method is the contamination of the wet coating material with particles from the surrounding environment during the heating phase.

For reasons of environmental protection and for reasons of cost, more particularly capital investment costs, radiation-curable coating materials are coated preferably in solvent-free form. A problem, however, is that in solvent-free coating material systems, dust or dirt particles from the surrounding environment are not fully wetted and lead, in the cured films of coating material, to optical defects, which are enlarged further by a magnification effect and are highly disruptive.

For many optical requirements, the surface quality of the coating is insufficient when operating in accordance with the coating methods set out in JP-A-2004-130540. For instance, in particular between 100 and 120° C., an unwanted waviness may be formed in the coating in the direction of extrusion. Furthermore, as described above, disadvantages may occur as a result of incipient dissolution of the substrate surface. JP2004-130540A and JP7-74282B disclose the loss of impact toughness of the substrate as a result of incipient swelling during the coating process. In JP-A-2004-130540, the low viscosity of the coating material and the very severe incipient swelling that is induced as a result cause a loss of impact toughness in the boundary layer.

OBJECT

In the light of the prior art, an object of the present invention was to provide a method which does not have the above-depicted problems of the prior-art methods, or has them only to a reduced extent. As far as possible, the process is to be useful universally for producing coated substrates and also for producing laminates. The intention, furthermore, is to provide an apparatus for implementing the method of the invention.

In a first specific object, the method is to lead to very good long-term adhesion between substrate and coating and, respectively, between the individual layers in the laminate.

In a second specific object, the control of the method is to be relatively uncomplicated, so that there is no need for supervision by additional personnel.

In a third specific object, it is to be possible to have coated substrates featuring a high surface quality in accordance with the profile of requirements specified in DIN EN ISO 7823-2, section 4.2 "Appearance" (table). Preferably there ought to be as few surface defects as possible, such as waviness or air inclusions.

Furthermore, the method ought to be able to be made virtually maintenance-free, energy-efficient and environment-friendly. In addition, the method ought to be able to be integrated into existing extrusion lines, without subsequent effect on the extrusion speed.

Solution

These objects and others which, although not explicitly stated, can nevertheless be realized or inferred readily from the circumstances discussed in the introduction herein are achieved by a method having all of the features of claim 1 and also by an apparatus according to claim 10. Judicious modifications of the method of the invention are protected in dependent claims.

The inventors have surprisingly discovered that by a specific regulation of the incipient dissolution time and also, in preferred embodiments, of the contact temperature as well (for definitions of terms, see below), and also by curing of the coating material or adhesive in at least two curing steps, where at least one curing step, downstream of the first curing step, is a radiation curing, more preferably a UV curing, it is possible to achieve the stated objects in an inline coating method.

Without being tied to any particular theory, the inventors are of the view that through the implementation of curing in at least two curing steps, a higher rate of conversion of the reactive groups in the coating material or adhesive is achieved, this having the effect, among others, of contributing to the particularly good adhesion and the particularly good performance properties of the composite materials of the invention. It is also allows the line to achieve a greater productivity.

SUBJECT MATTER OF THE INVENTION

Figure 1:
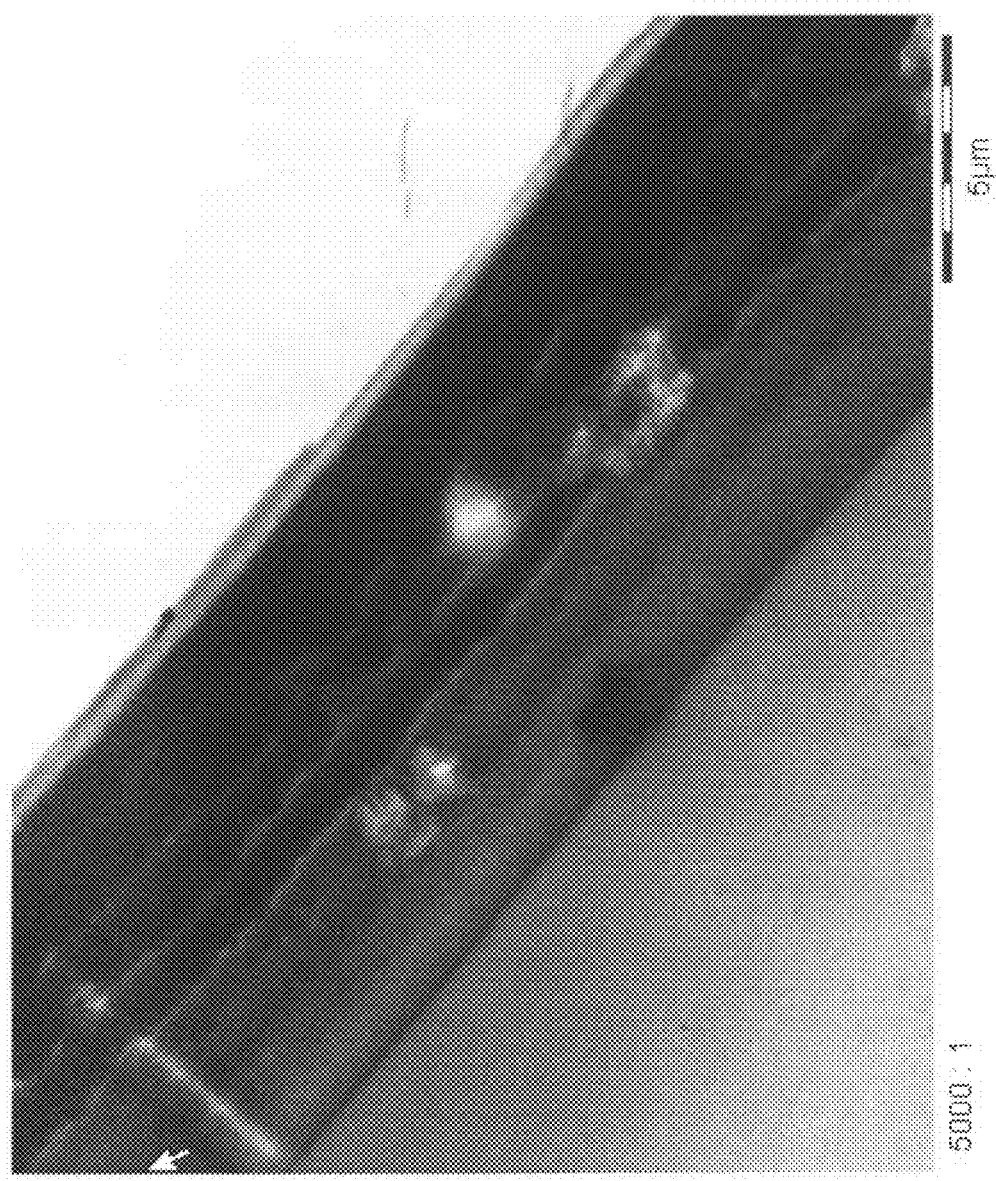
FIG. 1 shows a substrate of PMMA coated with a coating material.

The present invention accordingly provides a method for the continuous inline production of coated polymeric substrates or laminates,
comprising the steps of
  a. providing a substrate made of a polymeric material
  b. contacting the substrate with a curable—preferably by means of radical polymerization—coating material or adhesive
  c. lining the coating material or adhesive with an outer film
  d. curing the coating material or adhesive,
  e. optionally removing the outer film
  f. optional inline optical quality control
  g. optionally applying a protective film
characterized in that
  the curing takes place in at least two curing steps, the first curing step being a thermal or a radiation curing step, preferably a UV curing step, and at least one subsequent curing step being a radiation curing step, preferably a UV curing step, and
  where the first curing step is a radiation curing step, preferably a UV curing step or is a thermal curing step with delayed initiation, the incipient dissolution time is at least 10 seconds, or
  a spontaneous thermal initiation of curing takes place on the first contact between coating material or adhesive and
  the monomer mixture of the coating material or adhesive, preferably the combination of initiator and coating material monomers or adhesive monomers and/or the concentration of the thermal initiator,
  and/or
  the method conditions, preferably the conveying rate of the substrate and/or the contact temperature,
  are selected such as to obtain a mixed phase of coating material or adhesive and dissolved substrate polymer, the thickness of this phase corresponding to between 70% and 1%, preferably between 60% and 3%, very preferably between 50% and 5%, especially preferably between 70% and 5%, very especially preferably between 60% and 10%, and with particular preference between 50% and 20% of the total layer thickness of the outer layer or adhesive layer.

Additionally provided is an apparatus for continuous inline production of coated polymeric substrates or laminates,
comprising
  I. a means for providing a substrate comprising a polymeric material
  II. a means for providing an outer film III. a means for coating the substrate and/or the outer film with a curable—preferably by means of radical polymerization—coating material or adhesive characterized in that the apparatus is designed such that the coating material or adhesive applied to the substrate is lined in the apparatus with an outer film, in that the apparatus is designed such that the curing of the coating material or adhesive takes place in at least two curing steps, in that the apparatus comprises at least one radiation source, preferably at least one UV source, which is disposed in such a way that it initiates a curing step following on from the first curing step, in that the apparatus is designed such that the contact temperature can be varied, in that the apparatus is designed such that the incipient dissolution time, in the case where the first curing step is carried out by means of radiation curing, preferably UV curing, or of thermal curing initiated with a delay, is at least 10 sec.

The method of the invention results in very good adhesion between substrate and the outer layer or adhesive layer formed from the coating material or adhesive, respectively. As a result of the incipient dissolution time, but also of the implementation of curing in two or more steps, it is possible to ensure that the clear phase boundary floats between outer layer or adhesive layer and substrate and becomes a broad transition zone (mixed phase) of coating material or adhesive and dissolved substrate polymer. Through the method of the invention it is therefore possible to obtain products which differ clearly from the prior-art products in terms also of their structure and their performance properties. For instance, the composite materials of the invention can be machined more effectively than the uncoated substrates. Thermal bendability is possible even at very low radii, down to sheet thickness×10, without cracks forming in the coating. The chemical resistance and the fire performance of the composite materials of the invention are significantly better than for conventional composite materials.

The present invention accordingly further provides composite materials comprising an outer layer and a substrate, or a substrate, an adhesive layer and a further layer arranged on the adhesive layer, characterized in that in the outer layer or adhesive layer there is a phase boundary between an external phase, with a low fraction of dissolved substrate polymer, and a mixed phase, with an increased fraction of dissolved substrate polymer as compared with the external phase. The composite materials additionally exhibit a phase boundary between said mixed phase and the substrate.

Through the method of the invention, before curing of the layer of coating material or of adhesive, incipient dissolution and swelling of the substrate surface are achieved, which bear part responsibility for the effective adhesion of the coating to the substrate. In other words, following application of the liquid coating material or adhesive to the substrate, part of the substrate surface is incipiently dissolved, and the dissolved polymers mix with the coating material or adhesive. In this process, an external phase of the coating layer or adhesive layer is formed, this phase containing none, or only very small amounts, of dissolved substrate polymer. Also formed is a mixed phase composed of polymers of the coating material and dissolved substrate polymers. This mixed phase, disposed between external phase and substrate, acts like an adhesion promoter and ensures the effective adhesion of the coating of the invention to the substrate.

In one preferred embodiment, the composite materials of the invention feature a particularly broad mixed phase. The thickness of the external phase here is preferably between 30% and 99%, more preferably between 30% and 97%, very preferably between 30% and 95%, especially preferably between 40% and 90%, and very especially preferably between 50% and 80% of the total thickness of the outer layer or adhesive layer, and the thickness of the mixed phase, correspondingly, is between 70% and 1%, preferably between 70% and 3%, more preferably between 70% and 5%, very preferably between 60% and 10%, and especially preferably between 50% and 20%, with the two phases in total making 100% of the total layer thickness of the outer layer or adhesive layer.

The individual layers can be recognized and analysed in TEM micrographs (for measurement details, see below). For the sake of completeness, it may be noted at this point that depending on the choice of the outer film, it is possible for constituents of this film to pass into the external phase as well, and so it may be the case that the TEM shows a thin $4^{th}$ phase. In this case, however, all of the phases which are present between the mixed phase/external phase boundary and the external surface of the composite materials or the transition from adhesive layer to outermost layer are considered for the purposes of the present invention to be one phase, and specifically the external phase. In other words, when determining the thickness ratio between external phase and mixed phase, "sub-phases" within the external phase are not considered separately for the purposes of the present invention.

In FIG. 1 of the present invention, a substrate of PMMA has been coated with a coating material (for details see Example 2, coating parameters E2). Clearly evident is the light-coloured substrate in the left-hand bottom corner, followed by the somewhat darker mixed phase and lastly by the darkest, external phase. The white region in the top right-hand corner is air. The slight waves and patterns within the external phase are cutting artefacts which are due to the sample preparation procedure. In FIG. 1, the thickness of the mixed phase is about 42% of the total thickness of the outer layer, and the thickness of the external phase, accordingly, is about 58%.

It is an advantage of the method of the invention that the outer film, if a sacrificial film is used, can be used a number of times. Furthermore, the control of the method can be made relatively uncomplicated, with the method being insensitive, in particular, to fluctuations in temperature. Moreover, the surface quality of the coated substrate or of the laminate is high. Hence, in particular, there are virtually no surface defects, such as waviness or air inclusions. This is the case more particularly when an inline optical quality control is carried out in the method of the invention, thereby allowing any deteriorations in quality to be counteracted immediately.

The method of the invention can also be used in order to obtain a structured surface simply and reliably. In this case, the advantages set out above in relation to a high level of adhesion can likewise be obtained.

Furthermore, the method can be carried out reliably and simply on known lines, allowing, in particular, long maintenance intervals and low downtimes to be obtained. The method of the invention is notable for low energy costs and can be made environment-friendly. In particular it is possible to do entirely without solvent, with no hazardous substances having to be released to the environment. As a result, specific and very expensive anti-explosion measures can be omitted, and coating material yields of up to 100% can be realized.

The method of the invention can be largely automated, and the necessary assemblies can be installed into existing cooling sections of extrusion lines, since these assemblies take up only a small amount of space. As a result, the required staffing can be kept low.

In comparison to offline methods, the method of the invention leads to a significant cost advantage. As a result of the lining of the layer of coating material or the layer of adhesive with a film, it is possible to dispense with expensive inertization with nitrogen.

DEFINITIONS OF TERMS

The present invention is described in detail below. Beforehand, though, a number of important terms are defined.

A substrate for the purposes of the present invention is a plastic web which depending on thickness may be processed either to a film or to sheets. The substrate may consist of a solid plastic web, but it is also possible, by extrusion through corresponding dies, to produce what are called hollow-chamber profiles. Corresponding technologies are known to the skilled person. The substrate may also take the form of a laminate of a plurality of plastics or plastics layers, optionally joined by means of corresponding adhesive layers.

An outer film is a film which is placed onto the coating material or adhesive in such a way as to enclose said coating material or adhesive between the outer film and the substrate. Where the method of the invention produces a coated substrate, the outer film used is a sacrificial film, which is placed onto the coating material before or during the first curing step and is removed again after the first or a further curing step. In one particular version of the method of the invention, this implies that the sacrificial film is not removed during the production of the composite and is retained as a protective film during storage and transit, being removed only at the time of final application of the product according to the invention. The sacrificial film may have a structured surface, producing a structure in the layer of coating material. In this way it is possible to produce coated substrates having a structured surface. The sacrificial film is preferably used again.

Where the method of the invention produces a laminate, then instead of a coating material, an adhesive curable by means of radical polymerization is used, and the outer film, after curing, is integrated firmly into the laminate. In this case as well, depending on the structure of the outer film, a structured surface may be produced.

Structured means that the surface of the outer layer, i.e. of the outermost layer of the product according to the invention, has indentations, elevations, unevennesses, etc.

Contact temperature describes the temperature of the substrate surface which is brought into communication with the coating material or adhesive, measured 5 cm before the first contact of the substrate with the coating material or adhesive.

Outer layer identifies the cured coating of a substrate with the coating material. In the final application, the outer layer forms the outer surface of the composite of the invention. In contrast, layer of coating material identifies the layer obtained after application and before ultimate curing of the coating material on the substrate.

Adhesive layer identifies the cured coating of a substrate with the adhesive. The adhesive layer forms a connecting layer between the substrate and a further outer layer of the composite. In contrast, layer of adhesive identifies the layer obtained following application and before ultimate curing of the adhesive on the substrate.

Incipient dissolution time describes the time elapsing between the first contact of the coating material or adhesive with the substrate, and the beginning of the first curing step. Where the first curing step is carried out in the form of a thermal cure, i.e. the coating material or adhesive comprises a thermally activatable initiator, the incipient dissolution time, depending on the temperature of the substrate, may also be zero or virtually zero, i.e. curing may commence immediately after first contact between substrate and coating material or adhesive. In this case, however, curing is controlled so that sufficient incipient dissolution takes place in parallel to the commencing curing. Where the first curing step is carried out by means of radiation curing, preferably by means of UV curing, the incipient dissolution time is the time from the first contact of the coating material or adhesive with the substrate to the first exposure of the coating material or adhesive to rays.

A curing step for the purposes of the present invention is a polymerization reaction—triggered by activation of an initiator or of an accelerator or by direct energy supply to overcome the activation energy for the reaction of monomers and oligomers, e.g. in the polyaddition or polycondensation—of constituents of the coating material or of the adhesive. The present invention preferably encompasses thermal and radiation curing, the supplying of thermal or radiation energy, preferably UV energy, activating an initiator or an accelerator or the necessary activation energy being supplied, so that a radical polymerization reaction, a polycondensation or a polyaddition is triggered. The thermal energy required may be supplied via the substrate temperature, i.e. the substrate may be heated to the corresponding temperature before first contact with a coating material or adhesive which comprises a thermal initiator or is curable by polyaddition or polycondensation, or, if the substrate was too hot beforehand, it can be cooled before said first contact. It is also possible, however, for a substrate which on first contact with the coating material or adhesive does not have the necessary temperature to activate the initiator or accelerator or to supply the necessary activation energy to be first brought into contact with a coating material or adhesive and for the resulting composite to be subsequently heated and the thermal initiator activated.

Where two or more radiation sources arranged one after the other in the direction of movement of the substrate are utilized in the method of the invention, then it is assumed, in the context of the present invention, that each source initiates a curing step. Where, however, in order to be able to irradiate the entire width of the substrate, two or more radiation sources are arranged adjacently to one another perpendicularly to the direction of movement of the substrate, this is considered, in the context of the present invention, to be a curing step, especially when the radiation sources and doses are identical.

Radiation curing in the context of the present invention means curing by means of high-energy radiation, more particularly in the wavelength range from 220 nm to 480 nm, electron beams. Particularly preferred is curing by means of UV rays in the wavelength range from 260 nm to 420 nm.

The expression (meth)acrylate stands for acrylate, methacrylate and also mixtures of both. (Meth)acrylates having at least two double bonds are also known as crosslinking monomers.

DETAILED DESCRIPTION OF THE INVENTION

The method of the invention serves for the coating of substrates or for the production of laminates from corresponding substrates.

The Substrates

The substrates are produced preferably by thermoplastic shaping methods from moulding compositions or by continuous cast polymerization, with the moulding compositions comprising, with particular preference, thermoplastically processable polymers.

The preferred polymers include, for example, poly(meth) acrylates, more particularly polymethyl methacrylate (PMMA), poly(meth)acrylimides, polyacrylonitriles, polystyrenes, polyethers, polyesters, polycarbonates and polyvinyl chlorides. Preferred here are poly(meth)acrylates and poly(meth)acrylimides. These polymers may be used individually and as a mixture. Furthermore, these polymers may also be present in the form of copolymers. Preferred copolymers include styrene-acrylonitrile copolymers, acrylonitrile-styrene-butadiene copolymers, styrene-maleic acid copolymers, (meth)acrylate-styrene-maleic anhydride copolymers, polyphenylsulphones (PPSU), COC polymers (Cyclic Olefin Copolymers) and polymethyl methacrylate copolymers, more particularly polymethyl methacrylate-poly (meth)acrylimide copolymers.

According to one particular aspect of the present invention it is possible to use moulding compositions which comprise polycarbonates. Polycarbonates are known in the art. Polycarbonates may be considered formally to be polyesters of carbonic acid with aliphatic or aromatic dihydroxy compounds. They are easily accessible through reaction of diglycols or bisphenols with phosgene or with carbonic diesters, by polycondensation reactions or transesterification reactions, respectively. According to one particular embodiment of the present invention it is possible to use moulding compositions which comprise at least 20% by weight, preferably at least 50% by weight and very preferably at least 80% by weight of polycarbonates.

In accordance with another embodiment of the present invention, particularly preferred moulding compositions for producing the substrates have at least 15% by weight, preferably at least 50% by weight and more preferably at least 80% by weight of poly(meth)acrylates, polymethyl methacrylate, polymethylmethacrylimide and/or polymethyl methacrylate copolymers, based on the total weight of the moulding composition. The expression (meth)acrylates encompasses methacrylates and acrylates and also mixtures of both.

Poly(meth)acrylates are widely known polymers which are obtainable in accordance with the invention preferably by polymerization of a monomer mixture which has at least 60% by weight, preferably at least 80% by weight, of (meth)acrylates, based on the weight of the monomers. The preparation of the (meth)acrylate homopolymers and/or copolymers by the various processes of radical polymerization is known per se. Hence the polymers may be prepared in bulk, solution, suspension or emulsion polymerization. Bulk polymerization is described by way of example in Houben-Weyl, Volume E20, Part 2 (1987), p. 1145ff. Useful information relating to solution polymerization is found in the same publication at page 1156ff. Details relating to the suspension polymerization technology are found in the same reference at page 1149ff., while emulsion polymerization is set out and elucidated therein at page 1150ff.

A further preferred substrate is a (co)extrudate of one or more poly(meth)acrylate layers comprising organic and/or inorganic fillers, having non-transparent optical properties and a particularly high-value, glossy surface with depth effect. One commercial example is PLEXIGLAS Parapan.

Preferred polymeric substrates may comprise customary additives. These additives include, among others, organic and inorganic fillers, nanoscale particles, pigments, release agents, antistats, antioxidants, demoulding agents, flame retardants, lubricants, dyes, flow improvers, light stabilizers, organic and inorganic UV absorbers, sterically hindered amines, agents providing protection from weathering, and plasticizers and impact modifiers. The additives are used in a typical amount, i.e. up to 80% by weight, preferably up to 30% by weight, based on the total mass. Where the amount is greater than 80% by weight, based on the total mass, then properties of the plastics such as their processing properties, for example, may be greatly impaired.

The substrates of the invention are generally scratch-sensitive if not finished on the surface, and couple out light at every scratch. One commercial example is PLEXIGLAS Endlighten, which is used especially for decorative purposes and illuminated advertising. In accordance with the invention, therefore, it is preferred to apply a coating material in order to produce a scratch-resistant coating.

Production of the Substrates

The substrate to be coated may be produced by continuous cast polymerization or from moulding compositions by any known shaping technology, the present method leading to surprising advantages in the case of extrusion processes. By this means it is possible continuously to produce substrates and provide them during the cooling phase with a functional coating. This saves additional heating to the contact temperature, and hence time and costs. Accordingly, the substrate to be coated is obtainable preferably by extrusion.

Surprising advantages in terms of the quality of the resulting coating can be achieved by measures including the possession by the substrate of a contact temperature matched to the substrate material. Details of this are given later on below in the section on Method details.

At temperatures below this contact temperature indicated in detail later on below, the adhesion of the coating to the substrate may decrease. Furthermore, instances of hazing and cracking have been found after 1000 hours of weathering in a xenon test in accordance with DIN EN ISO 4892-2. Analytical investigations revealed, furthermore, that excessively low temperatures resulted in low double-bond is conversion rates in the coating material. Temperatures above these limits may often lead to impaired optical qualities. Furthermore, there may in this case be excessive adhesion of the sacrificial film, meaning that it can no longer be removed.

The substrate preferably has a thickness in the range from 10 μm to 500 mm, preferably 20 μm to 100 mm, more preferably 30 μm to 50 mm and very preferably 50 μm to 25 mm.

The Coating Material or Adhesive

The present method is used in particular for the coating of substrates with a coating material to give an outer layer. It can, however, also be used to produce laminates through the use of corresponding adhesives between two laminate layers. Coating material or adhesive is applied to the substrate and/or to the outer film and in accordance with the invention is cured.

The nature and composition of the coating material are dependent on the properties to be obtained in the outer layer.

Hence in accordance with the method of the invention it is possible among others to obtain outer layers which are scratch-resistant, weathering-stable, antistat, hydrophilic, hydrophobic, low-friction, printable, glossy, structured or matt or have two or more of the stated properties at the same time. It is also possible to obtain barrier properties or anti-graffiti properties. The outer layer may additionally have water-spreading, biocidal and/or self-cleaning properties.

The resins for thermal and/or radiation-induced, preferably UV-induced, curing are unsaturated compounds which lead to film formation in crosslinking reactions via free radicals. By varying the nature and number of functional groups, and also the chain lengths and chain structure, a large product pallet with a broad properties spectrum is accessible. The most important representatives of these products are acrylic ester compounds, followed by unsaturated polyesters. Preference is given in accordance with the invention to using coating materials and/or adhesives based on polyester acrylates, polyether acrylates, epoxy acrylates and urethane acrylates.

Preferred coating materials may comprise polymerizable constituents with a content of monomers, oligomers and higher-molecular-mass (meth)acrylic ester resins and/or vinyl compounds of at least 40%, preferably at least 60% and more preferably at least 80%.

The coating materials and adhesives used in accordance with the invention may comprise monomers as reactive diluents, which serve primarily for reducing the viscosity. In the course of the polymerization they are incorporated into the polymer chain and thus directly influence the properties of the coating material. An important feature of the monomers is their functionality. Monofunctional to hexafunctional monomers can be used. Through the functionality it is possible to control the crosslinking density and hence the chemical/physical film properties. Monomers used preferably in accordance with the invention include the following: trimethylolpropane triacrylate (TMPTA), butanediol diacrylate (BDDA), hexanediol diacrylate (HDDA), tripropylene glycol diacrylate (TPGDA), dipropylene glycol diacrylate (DPGDA), phenoxyethyl acrylate (POEA), 4-tert-butylcyclohexyl acrylate (TBCH), isobornyl(meth)acrylate (IBOA), hydroxyethyl(meth)acrylate (HE(M)A), butyl(meth)acrylate, ethyldiglycol acrylate (EDGA), butanediol monoacrylate (BDMA), isodecyl acrylate, dipentaerythritol hexaacrylate (DPHA), pentaerythritol tri/tetracrylate (TMPTA).

Of particular interest, furthermore, are coating materials for producing a scratch-resistant coating, which comprise not more than 90% by weight, more preferably not more than 50% by weight, of monomers having four or fewer double bonds.

The coating materials already used in accordance with the invention may further comprise film-forming components, i.e. prepolymers or oligomers. These components influence the basic character of the radiation-cured coating material such as hardness, scratch resistance, flexibility, strength of adhesion, elasticity, etc. In accordance with the invention, use is made primarily of compounds having radically polymerizable double bonds which form a film through crosslinking reactions. Particularly preferred film-formers for radical polymerization, preferably by radiation-induced, more preferably by UV-induced curing, are epoxy acrylates, polyester acrylates, polyether acrylates, polyurethane acrylates, silicone acrylates. Examples of these are Laromer® products from BASF, Ebecryl® products from Cytec, Genomer® products from Rahn, Sartomer® products from Sartomer.

Epoxy Acrylates

Epoxy acrylates are formed from the reaction of aromatic or aliphatic epoxy resins with free acrylic acid. Coatings are notable for high reactivity, high hardness and good chemicals resistance.

Polyester Acrylates

Polyester acrylates are reaction products of polyesters having terminal hydroxyl groups and acrylic acid. The coatings are notable for good hardness and weathering resistance.

Polyether Acrylates

Polyether acrylates are products of esterification of usually linear polyethers having free hydroxyl groups and acrylic acid.

Polyurethane Acrylates

Polyurethane acrylates are obtained in the reaction of polyurethane prepolymers having terminal isocyanate groups and hydroxyalkyl acrylates. The simplest urethane acrylates come about through reaction of a diisocyanate with a monomer containing hydroxyl groups. The coatings are notable for very good weathering stability, chemicals resistance and hardness in conjunction with high flexibility.

Silicone Acrylates

Silicone acrylates are formed either by reaction of polydialkylsilanes having terminal silanol groups and hydroxyalkyl acrylates, or by addition reaction of acrylic acid with polydialkylsilanes which contain terminal epoxide groups. The products of this acrylate group are often used in adhesive formulations.

The abovementioned components of the coating materials or adhesives which can be used in accordance with the invention are known to the skilled person and are available commercially. Depending on the intended property of the outer layer or adhesive layer, a corresponding coating material or adhesive can be selected. Discussed below are preferred materials for outer layers and adhesive layers:

Coating Materials for Scratch-Resistant Coatings

The scratch resistance of the coating is dependent on factors including the degree of crosslinking, but the latter cannot be increased arbitrarily. If the crosslinking density is too high, there may be a sharp increase in polymerization contraction, and stresses in the coating may be frozen in, with no ability for them to be relaxed subsequently. The frozen-in stresses may result after loading, by artificial or natural weathering, for example, in a loss of adhesion or in the deformation of the article coated with the coating material. It is therefore favourable to set a balance between scratch resistance and crosslinking density. For this reason, the number of double bonds per kg of coating material is preferably kept within an optimum range. In this context, the scratch resistance can be increased in particular through the use of (meth)acrylates having three or more double bonds.

Coating Materials for Water-Spreading Outer Layers

Examples of coating materials for producing hydrophilic, water-spreading outer layers having improved antistatic properties and easy-clean surfaces are compositions having a silicon dioxide-containing sol comprising $SiO_2$ nanoparticles in dispersion in a monofunctional or polyfunctional monomer. The higher the $SiO_2$ content of the coating materials, the more hydrophilic the coating. In the simplest case, a commercially available silica nanosol with monomers having one or more double bonds in the (meth)acrylate, such as, for example, a 50 percent $SiO_2$ sol in acrylate, to available from Nanoresins, Geesthacht, under the name Nanocryl, can be admixed with photoinitiators and cured. Sols of this kind can be mixed with one another and/or admixed with further (meth)acrylates, oligomers and additives, in order to adjust the viscosity, the reactivity, the crosslinking, flexibility, hardness, hydrophilicity and long-term stability of the coating.

Coating Materials for an Antistatic Outer Layer

Examples of coating materials for antistatic outer layers are formulations of the stated monomers and oligomers with at least one conductive inorganic filler, such as indium tin oxide, antimony tin oxide, other inorganic oxides and/or mixtures of the oxides, for example. Suitable inorganic fillers are available for example from Evonik-Degussa under the name AdNano ITO or from American Elements, Los Angeles (ATO).

Coating Materials for Self-Cleaning Surfaces

Examples of coating materials for self-cleaning photocatalytic outer layers comprise preferably titanium dioxide in the anatase or brookite modification. Since the photocatalytic material breaks down organic components in the coating, a particular composition of the coating with organic-inorganic constituents is necessary. The fraction of the oxidatively degradable components is selected to be as low as is necessary. Advantageous for the long-term stability is a multi-ply construction made up of one or more adhesion-promoting layers and an active ingredient layer, or a gradient of the photocatalytic material with an accumulation at the surface and as small as possible an amount at the phase boundary with the substrate or with the adhesion-promoting layer underneath.

In order to be optimally suitable for the method of the invention, the coating materials described in more detail above ought preferably to have a dynamic viscosity in the range from 50 to 10000 mPa*s at 25° C., more preferably in the range from 200 to 5000 mPa*s at 25° C. and very preferably in the range from 200 to 2000 mPa*s at 25° C., the dynamic viscosity being determinable to DIN 53018 using a cone/plate viscosimeter. In the case of adhesives, the dynamic viscosity is preferably in the to range from 100 to 20000 mPa*s at 25° C., more preferably in the range from 5000 to 10000 mPa*s at 25° C. and very preferably in the range from 1000 to 5000 mPa*s at 25° C. For adjusting the viscosity it is possible to add rheology control agents or polymers to the coating materials or adhesives, with radiation-curable, preferably UV-curable, oligomers being particularly preferred as thickeners.

For curing, the coating materials or adhesives used in accordance with the invention preferably comprise at least one initiator, activator and/or accelerator with which the curing of the layer of coating material or layer of adhesive is initiated. The reaction of the reactive groups of the coating material components or adhesive components may be by radical polymerization and/or polyaddition and/or polycondensation. It is possible to use coating materials or adhesives which cure only by one curing mechanism, though it is also possible to use mixtures whose monomers cure by two different mechanisms. In the case of such mixtures it is particularly preferred for at least some of the monomers in the coating material or adhesive to cure by radical polymerization and/or for dual-cure monomers to be present, which combine at least two different functional groups in one molecule, these groups being polymerized by two different mechanisms, preferably radical polymerization in combination with polyaddition and/or polycondensation. The nature of the initiator here is dependent on the method of curing; in accordance with the invention, at least one initiator activatable by radiation, preferably UV radiation, and optionally, additionally, one or more initiators activatable by thermal energy are used. Particularly in the case of dual-cure systems, a polyaddition or polycondensation may take place independently of the UV curing. These reactions may operate at moderate temperatures, even at room temperature. This means that the present invention also encompasses embodiments in which the applied layer is first of all initiated thermally or by UV, then subjected to the UV curing step, and, finally, a polycondensation or polyaddition takes place. The last curing step may last up to a week at room temperature. The particular advantage of the present invention is that the sheets can be stacked and packed as early as after the 2nd curing step. The 3rd curing step (thermal) proceeds in the background.

The starting radicals necessary to start the chain reaction may be formed in two different ways. This occurs either by intramolecular splitting or by intermolecular hydrogen abstraction from a hydrogen donor. In accordance with the invention, therefore, photoinitiators can be used which belong to the class of the α-splitters or of the hydrogen abstractors.

The photoinitiators must, in accordance with the invention, meet the following conditions:

the intended absorption range must be present within an emission range of the radiation sources, preferably UV sources, used.

they must be soluble in the coating material and stable on storage.

the radicals formed must be able to start the radical chain polymerization.

they must not be yellowing and must be low in odour.

The preferred photoinitiators with which a radical polymerization can be initiated include, among others, acylphosphine oxides, alpha-aminoketones, alpha-hydroxyketones, acetophenone derivatives, benzil dimethyl ketals, benzophenone-based initiators. Particularly preferred are 2,2-diethoxyacetophenone (DEAP, Upjon Corp), n-butyl benzoin ether (®Trigonal-14, AKZO) and 2,2-dimethoxy-2-phenylacetophenone (®Irgacure 651) and 1-benzoylcyclohexanol (®Irgacure 184), bis(2,4,6-trimethylbenzoyl)phenylphosphine oxide (®Irgacure 819) and 1-[4-(2-hydroxyethoxy)phenyl]-2-hydroxy-2-phenylpropan-1-one (®Irgacure 2959), triphenylphosphine oxide (TPO), Darocur 1173, Irgacure 907, Darocure BP, which are each available commercially from BASF (formerly Ciba). It is also possible to use mixtures of two or more photoinitiators.

The proportion of photoinitiator is not critical per se. The coating material or the adhesive preferably has 0.01% by weight to 10% by weight, more preferably 0.3% by weight to 7% by weight and very preferably 1% by weight to 5% by weight of photoinitiator, based on the polymerizable constituents of the composition.

In one particularly preferred embodiment of the present invention, the coating to material or the adhesive comprises at least two different initiators, which with very particular preference can be activated at different energy inputs of the radiation source, preferably at different wavelengths of the UV light. This makes it possible for only one initiator to be activated first of all, in a first radiation curing step, and for the second initiator to be activated then in a second radiation curing step with a different is radiation source, preferably UV source.

As already mentioned, the coating material or adhesive may also comprise at least two different initiators, in which case one is a thermal initiator and another is an initiator which is activatable by radiation, preferably UV radiation. This makes it possible to activate the thermal initiator first, in a first curing step, and then to activate the second initiator in a second curing step with a radiation source, preferably a UV source. By this means it is also possible, for example, to use outer films which are not sufficiently radiation-transparent, or not at all, e.g. not UV-transparent and to remove them optionally before the $2^{nd}$ curing step. This is especially relevant when radiation curing, preferably UV curing, is possible neither through the outer film nor through the substrate, in the case of opaquely coloured substrates, for example.

The preferred thermal initiators include azo compounds, peroxy compounds, persulphate compounds or azoamidines. Particularly preferred, but not limiting, are 2,2'-azobis(isobutyronitrile) (AIBN), tert-butyl per-2-ethylhexanoate, tert-butyl perpivalate, 2,2'-azobis(2,4-dimethylvaleronitrile), tert-butyl perneodecanoate, bis(4-tert-butylcyclohexyl) peroxydicarbonate, diisopropyl peroxydicarbonate, tert-amyl perneodecanoate, tert-amyl perpivalate, dilauroyl peroxide, dibenzoyl peroxide, diisobutyryl peroxide, dicumene peroxide, cumene hydroperoxide, cumene peroxyneodecanoate, 1,1,3,3-tetramethylbutyl peroxyneodecanoate, di-n-propyl peroxydicarbonate, tert-amyl peroxyneodecanoate, di(4-tert-butylcyclohexyl) peroxydicarbonate, di(2-ethylhexyl) peroxydicarbonate, tert-butyl peroxyneodecanoate, di-n-butylperoxy dicarbonate, dicetyl peroxydicarbonate, dimyristyl peroxydicarbonate, 1,1,3,3-tetramethylbutyl peroxypivalate, tert-butyl peroxyneoheptanoate, di(3,5,5-trimethylhexanoyl) peroxide, dipotassium persulphate, ammonium peroxydisulphate, 2,2'-azobis(isobutyramidine) hydrochloride, benzpinacol, dibenzyl derivatives, methylethylene ketone peroxide, 1,1-azobiscyclohexanecarbonitrile, methyl ethyl ketone peroxide, acetylacetone peroxide, dilauryl peroxide, didecanoyl peroxide, ketone peroxide, methyl isobutyl ketone peroxide, cyclohexanone peroxide, tert-butyl peroxybenzoate, tert-butyl peroxyisopropyl carbonate, 2,5-bis(2-ethylhexanoylperoxy)-2,5-dimethylhexane, tert-butyl peroxy-2-ethylhexanoate, tert-butyl peroxy-3,5,5-trimethylhexanoate, tert-butyl peroxyisobutyrate, tert-butyl peroxyacetate, 1,1-bis(tert-butylperoxy)cyclohexane, 1,1-bis(tert-butylperoxy)-3,3,5-trimethylcyclohexane, tert-butylhydroperoxide, and also the radical initiators available from DuPont under the name ®Vazo, as for example ®Vazo V50 and ®Vazo WS. It is also possible to use mixtures of different thermal initiators.

In the context of the present invention it is also possible to apply two different coating materials or adhesives each with different initiators and to cure first the one and then the other coating material or adhesive.

Finally, the coating material or the adhesive may comprise customary additives, such as colorants, pigments, examples being metallic pigments, UV stabilizers, fillers or nanomaterials, more particularly ITO nanoparticles, ATO nanoparticles or $SiO_2$ nanoparticles, or carbon nanotubes (CNT). The proportion of these additives is dependent on the intended application and may therefore lie within wide ranges. This fraction, if additives are present, may amount preferably to 0% to 70% by weight, more preferably 0.1% to 40% by weight.

The coating material or adhesive may comprise small proportions of solvents, with the proportion preferably being less than 5% by weight, more preferably less than 2% by weight. Solvents here are low molecular mass compounds which serve to bring the components of the coating composition into solution, to control rheological properties and to provide incipient swelling of the substrate, in order to obtain better mechanical adhesion, without these compounds being part of the cured coating. In one preferred version, the coating is prepared free from solvents, with only the reactive diluents taking on the function of the solvents. In the latter case, the coating line can be configured inexpensively without protection from explosion.

In accordance with the method of the present invention, the coating material or the adhesive is applied between an outer film and a substrate and cured. This is preferably accomplished by the layer of coating material or layer of adhesive having is a layer thickness, measured 20 cm after the laminator gap, of more than 3 μm, preferably 5 to 100 μm, more preferably 5 to 80 μm, very preferably 7 to 70 μm, especially preferably 10 to 60 μm and very especially preferably 10 to 40 μm.

Where the invention is configured as a laminate with a layer of adhesive, then the larger layer thicknesses are preferred in each case.

The Outer Film

As already mentioned, the outer film may be a "sacrificial film", which is removed again in method step (e) after the first or a further curing step (d), preferably a UV curing step (d), or else may be a film which is attached to the substrate after the curing of the adhesive and thus forms a laminate.

The nature and constitution of the sacrificial film are not critical per se, although the constitution of the film material ought to be such that the cured coating composition exhibits minimal adhesion to the film material. The adhesion, however, must not be so low that delamination occurs even on curing. A moderate adhesion, which ensures easy removal after curing, is the most favourable for the process.

In the case of outer films which are not radiation-transparent, e.g. not UV-transparent, at least the first curing stage takes place preferably either thermally or by radiation curing, preferably UV curing, through the substrate, provided that the substrate is sufficiently radiation-transparent, in particular UV-transparent.

Suitable materials for producing the outer films include plastic, metal, paper, textile or combinations thereof, e.g. laminates. The preferred plastics include, for example, polyethylene terephthalate (PET), partially acetylated cellulose derivatives, available commercially as "triacetate" or "diacetate", cycloolefin copolymers (COCs) and also, for less exacting optical demands, polyolefins.

In the curing process according to the invention, the surface constitution of the outer film, e.g. the smooth, rough or structured surface, is imaged as a negative on the surface of the cured coating.

In accordance with one particular embodiment of the present invention, the surface of the outer film, in order to obtain particularly smooth surfaces on the outer layer facing the substrate, may have a gloss of at least 80 gloss units at 20°, preferably greater than 100° and more preferably greater than 120°, measured with the Byk-Gardner micro-Trigloss gloss meter.

In another embodiment, the film has a rough or structured surface which is impressed on the coating material.

A feature of particularly environment-friendly methods is that the sacrificial film, which may also be referred to as liner material, can be used again. Accordingly, for example, a seamlessly closed belt, preferably a metal belt, can be used and can be run continuously in circulation.

In accordance with the invention, the sacrificial film is preferably removed after the first or a further curing step. In one preferred embodiment of the present invention, the sacrificial film is removed after the first but before the second curing step. In this way, a first curing takes place thermally or by radiation, in particular UV radiation, "through" the sacrificial film or "through" the substrate, but the radiation curing downstream of the first curing step takes place without a sacrificial film between the layer of coating material and the radiation source, preferably the UV source. Since the sacrificial film as well gives rise to a certain attenuation of the intensity of the radiation in the case of a first radiation curing "through" the sacrificial film, this method can be used to achieve a significantly better energy utilization of the radiation source, in particular a UV source, and hence a complete curing which is more rapid overall. In this embodiment it is possible, furthermore, to use two different radiation initiators, in particular UV initiators, of which one can be activated "through" the sacrificial film, but the other can be activated only after the sacrificial film has been removed.

It is of course also possible to remove the sacrificial film only after the last curing step. In this case the sacrificial film may at the same time also function as a protective film, i.e., it may remain on the final product, and hence be removed only after storage and transient to the intended location.

Method Details

It has proved to be judicious for the coating material not to reach to the outer margin of the substrate or of the film. With preference it is possible to leave uncoated at the margin a strip of about 0.1 to 10 cm, preferably 0.5 to 7 cm. This strip serves as a buffer for the coating material pressed out in the laminator. By controlling the metering and the applied pressure of the laminating roll it is possible to prevent the coating material being pressed out at the margin of the preferably web-form substrate, between outer film and substrate.

The application of the coating material or adhesive to the substrate and/or to the outer film may take place in any known way. Suitable methods for coating are casting, spraying, knife coating, extruding, roll coating or uniform metering via one or more metering points by means of one or more pumps. Preferred methods are supply via one or more dies, more preferably a slot die, or via doctor blades, with the coating assemblies being configured and the coating amount being distributed and limited in such a way that uncoated strips (as described above) remain at the margins of the substrate and/or liner material.

In one particular embodiment, the coating material or the adhesive may be applied directly to the substrate that is to be coated. Furthermore, it may be applied to the side of the outer film facing the extrudate and be pressed onto the opposing substrate by at least one roll.

In another embodiment, both the substrate to be coated and the outer film may be coated before being compressed in the laminator. In the case of this coating variant, the possibility exists of merging different functionalities, such as adhesion promoter and functional outer layer, for example. This method offers further possibilities, such as the formation of a gradient in the functionality, in the barrier properties, or combination of different functionalities, such as an anti-graffiti quality and a scratch-resistant coating, for example.

In one especially preferred embodiment, the coating material or the adhesive is applied to the substrate and/or to the outer film in such a way that a bead is formed between outer film and substrate immediately ahead of the entry into the laminator or into the pressure application rolls (11). The coating material or adhesive is preferably applied such as to form a bead which towards the margin of the substrate has a region which has a decreasing bead length in the direction of the margin of the substrate. By bead length in this context is meant the length of the bead from the pressure application nip, i.e. the point at which the two pressure application rolls of the laminator or pressure application rollers (11) have the least distance from one another, and the end of the extent of the bead in the extruder direction. A bead length decreasing towards the margin of the substrate means that the bead length at the outer margin of the substrate is short and increases continuously or discontinuously towards the middle. Examples of conceivable beads include trapezoidal beads which have a bead end extending approximately parallel to the rolls in the middle of the substrate and which then have a decreasing bead length in the direction of the substrate boundary from a particular point onwards. Likewise conceivable are approximately triangular, wedge-shaped, semi-circular or semi-oval beads, which have the greatest bead length approximately in the middle of the substrate, this bead length then decreasing on both sides towards the margin. Beads of these kinds can be generated, for example, when the coating material or the adhesive is applied only at a point in the middle of the substrate and/or of the outer film or only in a region in the middle of the substrate and/or of the outer film. The bead length is preferably between 0.5 mm at the shortest point and up to 30 cm at the longest point, preferably 0.5 cm at the shortest point and up to 25 cm at the longest point, and more preferably at least 1 cm at the shortest point and up to 20 cm at the longest point. This bead length ensures that there is always a sufficient reservoir of coating material or adhesive present and hence that defects in the coating can be avoided. Without being tied to any particular theory, moreover, the inventors are of the view that a sufficient bead length also enhances the wetting of the substrate and of the dust particles on the substrate and outer film, which likewise increases the quality of coating. As a result of the preferred form of the bead, i.e. with a bead length decreasing towards the margin of the substrate, shearing forces, for example, are produced in the bead, and these forces, according to the observations of the inventors, have the effect, among others, of ensuring that air bubbles and individual dust particles are conveyed toward the margin, with a consequent increase in the quality of coating. At the margin of the sheet, then, there is preferably a suction removal device for excess coating material, which can be drawn off under suction, filtered and used again.

In order to be able to build up the bead as rapidly as possible, it is preferred, when starting up the operation according to the invention, to meter a greater amount of coating material or adhesive than in the steady state and, after the bead has formed correspondingly, to reduce metering down to the steady state.

A further positive effect achieved through bead formation is that a substantial equalization of substrate, outer film and coating material temperature or adhesive temperature can be achieved in a decidedly simple way before the laminator or pressure application rolls, respectively, and this may contribute to improved adhesion of the coating to the substrate and wetting.

In order to obtain an optically high-grade surface, the operation may be carried out preferably in a clean environment, such as in a clean room, for example.

In accordance with the invention, it is preferred to exert a pressure on the layer of coating material or layer of adhesive, between the outer film and the substrate, in a laminator or between nip rolls, more preferably with one or more rolls. For this purpose it is possible to use rolls customary in the field of extrusion and of lamination. These rolls may be manufactured of metal or elastic materials such as rubber or silicone. Surprising advantages can be achieved by rolls having a Shore A hardness to DIN ISO 7619 of between 30 and 100, more preferably between 40 and 80. It is preferred to use rolls having the above-stated Shore hardness, since particles of dirt are impressed into rolls that are too soft and may therefore not negatively affect the surface of the coating, and rolls that are too hard may lead to optical defects. The circumference of the roll may lie preferably in the range from 500 to 5000 mm, more preferably in the range from 1000 to 3000 mm. The laminating force required is preferably selected in the range from 10 to 10000 N, more preferably in the range from 50 to 6000 N and very preferably in the range from 100 to 4000 N. The laminating force is selected as a function of the Shore hardness of the upper laminating roll, viscosity of the coating material and sheet speed. The principles governing this selection are as follows:

- the softer the rubberizing of the roll, the higher the laminating force required
- the more viscous the coating material, the higher the laminating force required
- the greater the sheet speed, the higher the laminating force required.

In order to be able to check the setting of the laminating rolls there is preferably an in-line layer thickness measurement carried out after the laminating station. The layer thickness is preferably determined contactlessly by means of white light interferometry. In this case, reflection of light at interfaces in the layers produces interference spectra, from which it is possible to calculate the thickness of the layer. With particular preference, measurement takes place directly after the laminating station, through the outer film, before the coating material is subjected to the first curing step, since the measurement requires a clear interface between substrate and coating material.

In one preferred embodiment of the present invention, the substrate is obtained in step a) by extrusion, with the substrate width lying preferably in the range from 200 mm to 6000 mm, more preferably in the range from 400 mm to 3000 mm.

Depending on the molecular structure, chain length and chemicals resistance of the substrate material, it is preferred to observe a specific contact temperature and more preferably a specific combination of contact temperature and incipient dissolution time, in order to ensure that the mixed phase is sufficiently thick and hence the long-term adhesion is sufficiently good.

Particularly preferred contact temperatures for the respective substrate polymers are as follows:

TABLE 1

| Substrate polymer | Preferred contact temperature | More preferred contact temperature | Very preferred contact temperature |
|---|---|---|---|
| PMMA-based polymer | 70 to 110° C. | 80 to 110° C. | 90 to 100° C. |
| Polycarbonate-based polymer | 80 to 130° C. | 90 to 120° C. | 95 to 110° C. |
| Styrene-acrylonitrile-based copolymer (SAN) | 65 to 110° C. | 70 to 105° C. | 80 to 100° C. |
| Polyvinyl chloride-based polymer (PVC) | 60 to 110° C. | 70 to 100° C. | 75 to 95° C. |

In order to attain the contact temperatures identified above it may be necessary for the substrate to be heated by a suitable heating means, preferably a radiant IR lamp, prior to first contact with the coating material or adhesive, i.e. between steps a) and b), so that the desired contact temperature is attained.

Where the first curing step is carried out by means of radiation curing, preferably by means of UV curing, the incipient dissolution time is at least 10 s, preferably from 15 to 240 s, more preferably 20 to 180 s, and very preferably 30 to 120 s. This is necessary in order to obtain sufficient long-term adhesion on the part of the coating. The incipient dissolution time is controlled preferably by the conveying speed of the substrate or by the positioning of the $1^{st}$ radiation source, preferably of the $1^{st}$ UV source in relation to the position of the $1^{st}$ contact of the coating material or adhesive with the substrate.

In the course of thermal curing in the first curing step it is likewise necessary to ensure sufficient incipient dissolution. This can be achieved, for example, by carrying out thermal curing with delayed initiation—in other words, the substrate, on first contact with the coating material or adhesive, has a temperature which lies below the activation temperature of the thermal initiator and hence the thermal curing begins only by supply of heat, by means of a radiant IR lamp, for example. In this case, the incipient dissolution times specified in the preceding paragraph apply analogously.

Particularly preferred combinations of contact temperature and incipient dissolution time for the respective substrate polymers are as follows:

TABLE 2

| Substrate polymer | Preferred contact temperature and incipient dissolution time | More preferred contact temperature and incipient dissolution time | Very preferred contact temperature and incipient dissolution time |
|---|---|---|---|
| PMMA-based polymer | 70 to 110° C. and 15 to 240 s | 80 to 110° C. and 20 to 180 s | 90 to 100° C. and 30 to 120 s |
| Polycarbonate-based polymer | 80 to 130° C. and 15 to 240 s | 90 to 120° C. and 20 to 180 s | 95 to 110° C. and 30 to 120 s |
| Styrene-acrylonitrile-based copolymer (SAN) | 65 to 110° C. and 15 to 240 s | 70 to 105° C. and 20 to 180 s | 80 to 100° C. and 30 to 120 s |
| Polyvinyl chloride-based polymer (PVC) | 60 to 110° C. and 15 to 200 s | 70 to 100° C. and 20 to 120 s | 75 to 95° C. and 30 to 90 s |

In a further specific variant of the present invention, the thermal curing begins spontaneously with the first contact of the coating material or adhesive with the substrate, meaning that the incipient dissolution time is quasi 0 s. In order to ensure sufficient incipient dissolution in this case nevertheless, it is preferred for the thermal curing to proceed slowly or to run slowly at least at the beginning. This can be regulated in a great variety of ways, for example by the composition of the monomer mixture of the coating material or adhesive, or by method parameters, and so here all that is possible is a functional definition of this method step, namely that the composition of the monomer mixture of the coating material or adhesive and/or the method parameters are selected in such a way as to give a mixed phase whose thickness corresponds to between 70% and 1%, preferably between 60% and 3% and very preferably between 50% and 5% of the total thickness of the outer layer or adhesive layer.

Preferred possibilities for regulating the incipient dissolution in the case of spontaneous thermal initiation are the combination of initiator and coating material monomers or adhesive monomers, and/or the concentration of the thermal initiator, and/or the conveying speed of the substrate, and/or the contact temperature. As a result of the slow curing, incipient dissolution and curing take place in parallel.

The conveying speed of extruded plastic webs is dependent primarily on the throughput of the extruder. For economic reasons, the throughput operated is the technically possible maximum. Correspondingly, thick sheets are produced with a low rate of advance, and thin sheets and films at a high rate of advance. Depending on the conveying performance of the extruder and on the web width, for example, sheets with a thickness of 25 mm can be conveyed with a web speed of 0.2 m/min. Films 500 µm thick can be conveyed correspondingly, for example, at up to 8 m/min. The conveying speed of the substrate is preferably in the range from 0.1 to 10 m/min.

The method of the invention is preferably carried out in such a way that at least one surface of the substrate is cleaned before first contact with the coating material or adhesive, i.e. between steps a) and b). The apparatus used comprises corresponding means for this purpose.

At the end of the method of the invention, preferably, depending on whether the sacrificial film is removed or a laminate is produced, optionally after a likewise preferred inline optical quality control (step f), after the end of step d) or d) and e) or d) and f) or d) and e) and f), in step g), at least one surface of the resulting product is coated with a removable protective film.

Apparatus

The apparatus of the invention for continuous inline production of coated polymeric substrates or laminates comprises
I. a means for providing a substrate comprising a polymeric material
II. a means for providing an outer film
III. a means for coating the substrate and/or the outer film with a curable—preferably by means of radical polymerization—coating material or adhesive,
and is characterized
in that the apparatus is designed such that the coating material or adhesive applied to the substrate is lined in the apparatus with an outer film,
in that the apparatus is designed such that the curing of the coating material or adhesive takes place in at least two curing steps,
in that the apparatus comprises at least one radiation source, preferably at least one UV source, which is disposed in such a way that it initiates a curing step following on from the first curing step,
in that the apparatus is designed such that the contact temperature can be varied,
in that the apparatus is designed such that the incipient dissolution time, in the case where the first curing step is carried out by means of radiation curing, preferably UV curing, or of thermal curing initiated with a delay, is at least 10 s.

The means for providing the substrate preferably comprises an extruder, more preferably a single-screw extruder. By means of the extruder it is possible to provide a monolayer or a multilayer substrate in the desired thickness and width. The technologies for this are sufficiently known. The substrate, however, may also be provided, for example, by a roller. This method alternative, however, has the disadvantage that the substrate must first be heated accordingly.

In order to ensure that a sufficient desired contact temperature can be achieved, the apparatus preferably comprises a suitable heating or cooling means, preferably a radiant IR lamp as heating means, by which the substrate can be heated or cooled before first contact with the coating material or adhesive, so that the desired contact temperature is attained. With particular preference the apparatus is designed in such a way that the necessary heating or cooling effort is extremely small or does not arise at all.

In order to ensure particularly good quality on the part of the outer layer, the apparatus may comprise suitable cleaning means, preferably adhesive rolls and/or brush systems and/or corona pretreatment and/or means for blow removal using ionized air, by means of which at least one surface of the substrate and/or of the outer film is cleaned, preferably prior to first contact with the coating material or adhesive.

The apparatus of the invention comprises means for applying the coating material or adhesive to the substrate and/or outer film. Application may take place by means of casting, spraying, knife coating, extruding, roll coating or uniform metering by one or more metering points by means of one or more pumps. Suitable apparatus components are well known to the skilled person. The apparatus is preferably designed such that the supply of the coating material and adhesive takes place via one or more dies, more preferably a slot die, or via doctor blades or via a casting box, with the coating assemblies being designed and the coating amount being distributed and limited in such a way that uncoated strips (as described above) remain at the margins of the substrate and/or liner material.

The apparatus of the invention preferably comprises a laminator consisting of at least 2 laminating rolls or nip rolls, in which or between which the substrate, the layer of coating material or layer of adhesive and the outer film are compressed, at least the $1^{st}$ upper laminating roll preferably being intended to have an elastomer coating (rubber coating). For this purpose it is particularly preferred to use the rolls described in more detail above.

In one particularly preferred embodiment, the apparatus of the invention, after the laminator or pressure application rolls, comprises a means for monitoring the layer thickness of the coating material and for adjusting the height of the laminating rolls or pressure application rollers. The layer thickness is preferably determined to contactlessly by means of white light interferometry. In this case, reflection of light at interfaces in the layers produces interference spectra, from which it is possible to calculate the thickness of the layer. With particular preference, measurement takes place directly after the laminating station, through the outer film, before the coating material is subjected to the first curing step, since the measurement requires a clear is interface between substrate and coating material.

For the implementation of the first curing step in the form of a thermal cure, the apparatus of the invention may comprise, after the laminator, a heating means, preferably one or more radiant IR lamps.

The apparatus comprises a means for supplying the outer film and a means which allows the outer film (in this case a sacrificial film) to be removed again. This means is preferably designed such that the sacrificial film used as outer film is removed after the first or a further curing step. In one particular embodiment, the outer film may be designed as a seamless belt which is guided in circulation, and so does not have to be unwound from a roller and wound up again by another roller, but is instead run continuously in circulation.

It is likewise particularly advantageous if the apparatus includes an inline optical quality control, preferably in the form of a camera and detection system for optical defects. This control means is preferably arranged such that the quality control is carried out in step f), after the end of steps d) or e). This means makes it possible to react immediately to fluctuations in quality and to make corresponding adaptations immediately.

Typically, a protective film for transit is adhered to at least one surface of the finished product. The apparatus is therefore preferably designed in such a way that at least one surface of the resulting product is coated with a removal protective film, the coating means with the protective film being arranged preferably such that, depending on whether the outer film is removed or a laminate is produced, the protective film is applied after the end of steps d) or d) and e) or d) and f) or d) and e) and f), in step g).

In order to ensure particularly good results in the quality of the surfaces, the apparatus is preferably designed such that steps a) to d) or a) to e) or a) to f) are carried out under clean room conditions and/or controlled-climate conditions.

The apparatus of the invention comprises at least one radiation source, preferably at least one UV source. The UV source or sources are preferably radiation emitters, tubes, lamps and/or LEDs, whose radiation is in the wavelength range of 100 nm to 480 nm.

The apparatus of the invention preferably comprises at least two radiation sources, preferably at least two UV sources, with which the first and a further curing step are performed. Furthermore, the individual lamps can be adjusted in their power.

These radiation sources for the different curing steps may, in one preferred embodiment of the present invention, be arranged in such a way that two or more radiation sources initiate one or more curing steps through the outer film. Theoretically, the radiation sources may be arranged immediately after one another in the conveying direction of the substrate, or in an apparatus or a component of the apparatus. In order to avoid an excessive radiation dose acting on the substrate at particular points, however, the radiation sources are preferably arranged with a distance from one another in the conveying direction. The appropriate distance may be adapted individually according to substrate thickness, conveying speed, substrate composition and coating-material composition.

In a second particularly preferred embodiment of the present invention, the radiation sources are preferably arranged such that when a sacrificial film is being used, at least one radiation curing step, preferably at least one UV curing step, takes place through the outer film or through the substrate, and at least one radiation curing step, preferably at least one UV curing step, takes place after removal of the outer film. One preferred embodiment comprises two or more radiation sources, preferably UV sources, with different energy emissions, in the case of UV sources, with different wavelengths of UV light.

It is particularly preferred to use at least one UV radiation source having a regulatable power of >100 W/cm and at least one downstream UV radiation source having a regulatable power of >80 W/cm. More particular preference is given to using as the first UV source at least one Hg lamp with iron or gallium doping and at least one downstream Hg lamp ($2^{nd}$ UV source) with or without iron or gallium doping. As already stated above, the coating material or adhesive used in accordance with the invention may have two or more different initiators which can be activated at different wavelengths. Account is taken of this by the abovementioned UV sources. In one particularly preferred embodiment in this case at least one Hg lamp with iron or gallium doping is used, with the coating material or adhesive comprising a photoinitiator selected from the group consisting of acylphosphine oxides and blends thereof, benzil dimethyl ketal, alpha-aminoketones (examples: Irgacure 651, Irgacure 369, Irgacure 907, Irgacure 819, Darocure TPO, Darocur 4265), and at least one downstream Hg lamp with or without iron or gallium doping is used, with the coating material or adhesive comprising a photoinitiator selected from the group consisting of alpha-hydroxyketones and blends thereof (examples: Irgacure 184, Irgacure 1173, Irgacure 127).

Where the coating material or adhesive used in accordance with the invention contains only one kind of initiators, then the apparatus of the invention comprises at least two radiation sources, preferably UV sources, but these are preferably two times the same source.

The radiation sources used in accordance with the invention need not necessarily have different wavelengths, since by removing the sacrificial film after the first curing step, the coating is exposed to different wavelengths. PET film, for example, does not transmit radiation below 310 nm, and so, for example, an initiator which is activated at this wavelength may be activated only after the removal of the sacrificial film, whereas another may be activated even before the removal of the said film, although the same radiation sources are employed in each case.

The use of at least two curing steps, preferably at least two radiation sources of which more preferably at least one is a UV source, ensures that the coating material or adhesive is fully or largely fully cured even at a high web speed. The inventors have discovered that this is not possible with only one curing step, more particularly with only one radiation curing, especially with only one UV source and curing through the outer film. In the case of only one radiation source, its power must be selected at a very high level, and this is detrimental to product quality. Thus in the course of curing with a lamp, as a result of the associated very high energy input into the substrate, it may happen that there is a deformation of the substrate. In the case of curing with two radiation sources, the power of each individual source can be regulated down, and so the distribution of the required energy dose over a plurality of lamps leads to a balanced temperature level on the part of the substrate, as a result of which this substrate remains flat.

Furthermore, the aftercuring of the coating material with the 2nd radiation source leads to a higher C=C conversion and hence better weathering stability. More complete curing takes place in a shorter time than with one radiation source. Especially if the second radiation source is arranged after removal of the sacrificial film and hence there is no attenuation of the radiation by the sacrificial film, particularly good results have been obtained.

The apparatus of the invention is preferably designed such that the incipient dissolution time can be controlled by the regulation of the conveying speed of the substrate or by the positioning of the $1^{st}$ radiation source, preferably $1^{st}$ UV source, or of the heat source in the case of delayed thermal initiation, in relation to the position of $1^{st}$ contact of the coating material or adhesive with the substrate. In this case it is possible to vary either the position of the $1^{st}$ radiation source, preferably $1^{st}$ UV source or heat source and/or the position of $1^{st}$ contact of the coating material or adhesive with the substrate.

The composite materials of the invention can be used for producing articles, devices and objects which are highly stressed mechanically or else chemically, such as, for example,

- automotive parts, both interior and exterior, such as trim strips, tachometer hoods, visors, exterior mirrors, column trim components, mirror triangles, etc., or
- parts of electronic devices, such as in the household appliances or telecommunications or information technology or consumer electronics segments, for example, more particularly mobile phone, computer, organizer, MP3 player or television casings or display parts, including touch screens in particular, or
- as windows (glazing, particularly in vehicles (cars, utility vehicles, boats, aircraft, helicopters etc.)) or for objects such as buildings or for screens of all kinds, or
- as machine parts, e.g. machine casings, machine covers, etc., or
- as parts in furniture or shop or trade-fair construction, or
- as parts of thermal solar systems or photovoltaic systems, or
- as articles of everyday use such as picture frames, decorative articles, shop windows, etc.

They have the advantage, moreover, that they can be printed to particularly good effect. The reason for this, for example, is a high attainable surface tension of >36 mN/m on the part of the cured layer. The effective printability may additionally be explainable by the need, in the method of the invention, to have no surface-active additives in the coating material, since in the course of coating there is no interface formed between coating material and air. Hence there is also no accumulation of surface-active substances, which are detrimental with regard to printability, on the top face of the coating.

The coating of the invention does not detach from the substrate even when the finished component is greatly reformed, and this is likewise a great advantage over the prior art.

Measurement Methods

TEM Micrographs for Determining the Layer Thicknesses or Thicknesses of the Individual Phases In order to visualize the fine structure of the scratch-resistant coating and to determine the layer thicknesses of the mixed phase and of the external phase, thin sections were prepared using a Leica UC7 ultramicrotome, employing a Diatome Histo HI 4254 diamond blade with a cutting angle of 45° and a thickness of cut of 130 nm. The sections are taken parallel to the individual layers of the composite—in other words, if the layers of the composite material are arranged horizontally, the section should also be taken horizontally.

In the case of sections at a 45° angle to the scratch-resistant layer or perpendicularly to the scratch-resistant layer, there may be cutting artefacts (e.g. wavy compression zones), meaning that the individual layers can no longer be clearly recognized or that the layer thicknesses alter as a result of the pressure of the blade on the layers. In order to obtain good micrographs, use ought to be made where possible of a new or completely intact, good-as-new diamond blade.

TEM micrographs were prepared using the thin sections.

Determination of the Contact Temperature

This temperature determination was carried out using a pyrometer (non-contact infrared thermometer), the measurement point being located 5 cm ahead of the first contact between substrate and coating material or adhesive.

Below, the invention is elucidated in more detail using inventive and comparative examples, without any intention that this should constitute a limitation.

Example 1

Figure 2:
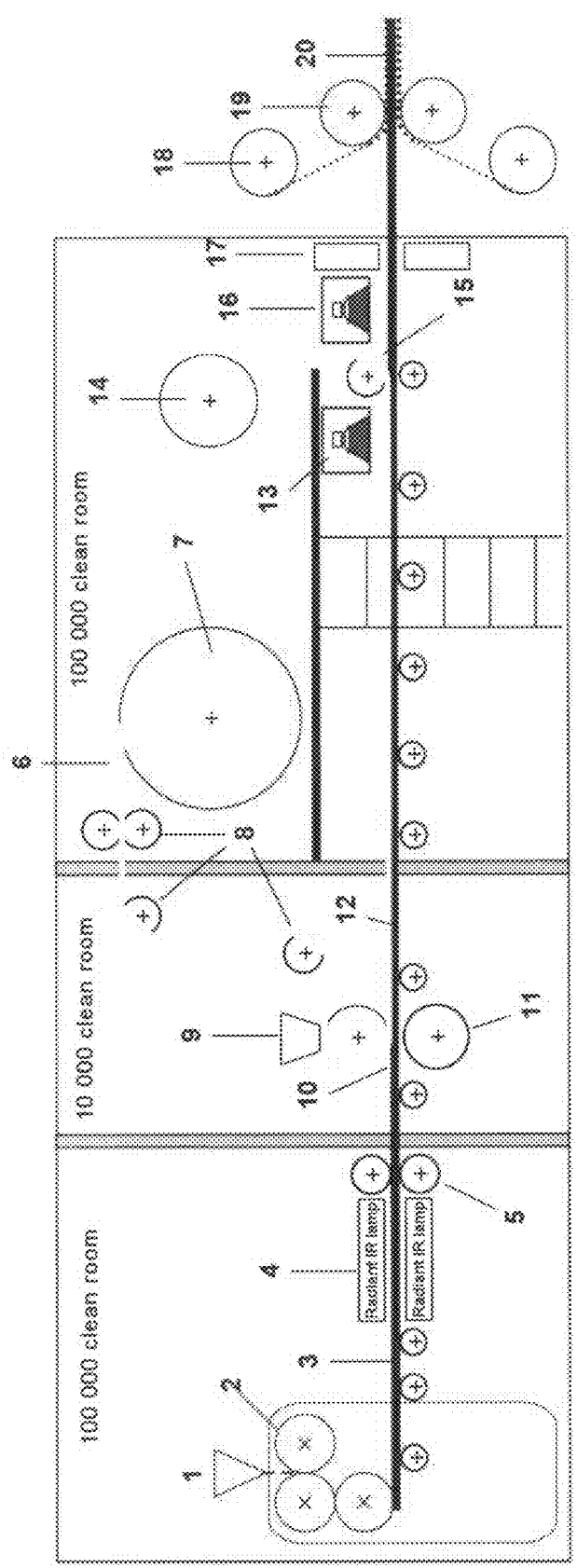
FIG. 2 shows by way of example an apparatus for carrying out the present invention.

FIG. 2 shows by way of example an apparatus for carrying out the present invention. A moulding composition is extruded by means of an extruder (1) and a substrate (3) having the desired thickness is produced by means of a plurality of rollers and rolls (2). The substrate can be brought when necessary to the desired contact temperature by means of the heating means (4). The substrate is therefore guided first through the heating means (4), in this case IR lamps, and subsequently through a surface cleaning means (5), consisting of adhesive rolls. In parallel, a sacrificial film (6) is unwound from a roller (7) and supplied via a plurality of rollers, a cleaning unit and adhesive rolls to a metering means (9), consisting of a doctor blade for the coating material. The metering means (9) coats one side of the sacrificial film (6) with the coating material or adhesive. The coated sacrificial film (6) is contacted with the substrate (3) at the point (10), it being ensured, by means of the heating means (4), for example, that the surface of the substrate (3) facing the sacrificial film has a contact temperature of 80 to 110° C. at the point (10). By means of the rolls (11), the sacrificial film (6) and the substrate (3), with the coating material located between them, are pressed together. The desired layer thickness of the coating material is set by regulating the metering in unit (9) and also by the pressure of the rolls (11). The composite (12) of substrate (3), sacrificial film (6) and coating material located between them is guided through beneath a first UV source (13), where a first curing step takes place. After that, the sacrificial film (6) is removed and is wound onto the roller (14). The substrate, freed from the sacrificial film (6) and coated with the partly cured coating material, is supplied to the second UV source (16), and the final cure is carried out. This is followed by inline optical quality control (17). Lastly, the coated substrate is coated on both sides with a protective transit film (18), and the film is pressed on by means of the rolls (19), thereby giving the finished product (20).

Devices (1) to (4) here are located in a controlled-climate clean room to ISO 14644-8. Parts (9)-(11) here are located in a controlled-climate clean room to ISO 14644-7, and parts (6), (7) and (12) to (17) are located in a further controlled-climate clean room to ISO 14644-8.

Example 2

Various tests for the scratch-resistant coating of PMMA and polycarbonate substrates were carried out by means of the apparatus of example 1. In these tests, the incipient dissolution time, the contact temperature and the power of the UV lamp were varied. The quality of the coated sheets was determined by means of the is criteria of transmission, yellowness, haze and adhesion of the coating, in each case after 0, 1000, 2000, 3000 and 5000 hours of weathering.

The transmission was measured using the Hazeguard plus from Byk-Gardner, in accordance with ASTM D 1003, at different points in time before and after artificial weathering.

The yellowness was measured using a Varian Cary 5000 in accordance with DIN 5036 at different points in time before and after artificial weathering.

The haze was measured using the Hazeguard plus from Byk-Gardner, in accordance with ASTM D 1003, at different points in time before and after artificial weathering.

The adhesion was measured by cross-cut with an instrument from Erichsen, Model 295, in accordance with DIN EN ISO 2409. The higher the values, the poorer the adhesion.

Weathering took place in a xenon test in accordance with DIN EN ISO 4892-2.

The moulding composition used for producing the substrate was PLEXIGLAS® moulding composition 7H. The substrate had a thickness of 3 mm and the layer of coating material a thickness of 13 μm. The coating material used was a mixture of hexafunctional aliphatic urethane acrylate, alkanediol diacrylate, benztriazole UV absorber, sterically hindered amine, cyclohexyl phenyl ketone and acylphosphine oxide.

The UV sources used were a 50 cm wide, Fe-doped lamp with a power of 150 W/cm at 100% output power. The web width of the substrate was 400 mm.

The further general conditions and results are found in Tables 3 to 5 below. Here:

In Table 3 the contact temperature was varied, the power of the UV lamp being once 30% and 60%.

In Table 4 the contact temperature and the output of the UV lamp were varied as in D1, but the incipient dissolution time was 90 seconds in each case.

Table 5 shows coating tests on polycarbonate with different contact temperatures.

TABLE 3

| hours | Parameter | Units | C1 | I1 | I2 | I3 | C2 | I4 | I5 | I6 | C3 |
|---|---|---|---|---|---|---|---|---|---|---|---|
| | Substrate | | PMMA XT | PMMA XT | PMMA XT | PMMA XT | PMMA XT | PMMA XT | PMMA XT | PMMA XT | PMMA XT |
| | Incipient dissolution time | sec | 30 | 30 | 30 | 30 | 30 | 30 | 30 | 30 | 163 |
| | Substrate temperature | ° C. | 60 | 80 | 90 | 100 | 60 | 80 | 90 | 100 | 70 |
| | UV lamp power | % | 30 | 30 | 30 | 30 | 60 | 60 | 60 | 60 | 30 |
| 0 | Transmission | % | 91.2 | 91.99 | 91.96 | 91.98 | 91.99 | 91.97 | 91.98 | 91.98 | 92.06 |
| 1000 | Transmission | % | 91.3 | 92.04 | 92.04 | 92.01 | 91.99 | 92.03 | 92.03 | 91.98 | 92.16 |
| 2000 | Transmission | % | 92.6 | 93.33 | 92.49 | 92.07 | 93.94 | 94.23 | 93.38 | 92.08 | 93.84 |
| 3000 | Transmission | % | 92.5 | 94.62 | 94.69 | 93.29 | 95.12 | 95.33 | 95.21 | 93.41 | 94.58 |
| 0 | Yellowness | | 0.48 | 0.40 | 0.47 | 0.44 | 0.43 | 0.46 | 0.41 | 0.45 | 0.45 |
| 1000 | Yellowness | | 1.7 | 0.55 | 0.56 | 0.49 | 1.30 | 0.55 | 0.56 | 0.49 | 0.52 |
| 2000 | Yellowness | | | 0.08 | 0.39 | 0.45 | | 0.01 | 0.05 | 0.49 | −0.25 |
| 3000 | Yellowness | | | 1.47 | 1.02 | −0.03 | | 0.97 | 0.47 | −0.02 | 2.93 |
| 0 | Haze | % | 0.38 | 0.32 | 0.32 | 0.28 | 0.35 | 0.17 | 0.17 | 0.34 | 0.15 |
| 1000 | Haze | % | 0.78 | 0.22 | 0.24 | 0.28 | 0.50 | 0.18 | 0.19 | 0.32 | 0.23 |
| 2000 | Haze | % | | 0.25 | 0.22 | 0.27 | | 0.25 | 0.22 | 0.3 | 1.36 |
| 3000 | Haze | % | | 0.48 | 0.3 | 0.27 | | 0.45 | 0.42 | 0.3 | 1.18 |
| 5000 | Haze | % | | 1.36 | 0.86 | 0.71 | | 1.39 | 0.8 | 0.8 | 1.53 |
| 0 | Adhesion | GT | 0 | 0 | 0 | 0 | 0 | 0 | 0 | 0 | 0 |
| 1000 | Adhesion | GT | 5 | 0 | 0 | 0 | 5 | 0 | 0 | 0 | 0 |
| 2000 | Adhesion | GT | | 0 | 0 | 0 | | 0 | 0 | 0 | 0 |
| 3000 | Adhesion | GT | | 0 | 0 | 0 | | 0 | 0 | 0 | 1 |
| 5000 | Adhesion | GT | | 0 | 0 | 0 | | 0 | 0 | 0 | 5 |

TABLE 4

| hours | | Units | I7 | I8 | I9 | I10 | I11 |
|---|---|---|---|---|---|---|---|
| | Material | | PMMA XT | PMMA XT | PMMA XT | PMMA XT | PMMA XT |
| | Incipient dissolution time | sec | 90 | 90 | 90 | 90 | 90 |
| | Substrate temperature | ° C. | 80 | 90 | 100 | 80 | 90 |
| | UV lamp power | % | 30 | 30 | 30 | 60 | 60 |
| 0 | Transmission | % | 91.94 | 91.93 | 91.92 | 91.95 | 91.97 |
| 1000 | Transmission | % | 91.97 | 92.01 | 92.02 | 92.03 | 92.06 |
| 2000 | Transmission | % | 92.64 | 92.53 | 92.96 | 92.38 | 92.35 |
| 3000 | Transmission | % | 92.13 | 94.89 | 94.03 | 94.86 | 94.74 |
| 5000 | Transmission | % | 95.3 | 95.4 | 95.05 | 95.22 | 95.48 |
| 0 | Yellowness | | 0.40 | 0.38 | 0.36 | 0.38 | 0.38 |
| 1000 | Yellowness | | 0.45 | 0.50 | 0.46 | 0.48 | 0.48 |
| 2000 | Yellowness | | 0.17 | 0.21 | −0.04 | 0.17 | 0.17 |
| 3000 | Yellowness | | 0.3 | −0.13 | −0.32 | −0.04 | −0.22 |
| 5000 | Yellowness | | 0.19 | 0.19 | 0.39 | 1.18 | 0.58 |
| 0 | Haze | % | 0.26 | 0.22 | 0.20 | 0.25 | 0.25 |
| 1000 | Haze | % | 0.19 | 0.31 | 0.20 | 0.22 | 0.25 |
| 2000 | Haze | % | 0.24 | 0.24 | 0.37 | 0.33 | 0.34 |
| 3000 | Haze | % | 0.25 | 0.32 | 0.3 | 0.26 | 0.3 |
| 5000 | Haze | % | 0.51 | 0.49 | 0.48 | 2.43 | 0.47 |

TABLE 5

| hours | | Unit | I13 | I14 | I15 | C4 |
|---|---|---|---|---|---|---|
| | Material | | PC | PC | PC | PC |
| | Incipient dissolution time | sec | 60 | 60 | 60 | 60 |
| | Substrate temperature | °C. | 80 | 90 | 100 | 120 |
| | UV lamp power | % | 30 | 30 | 30 | 30 |
| 0 | Transmission | % | 87.79 | 87.74 | 87.75 | 87.85 |
| 1000 | Transmission | % | 88.51 | 88.63 | 88.40 | 88.46 |
| 2000 | Transmission | % | 88.78 | 88.79 | 88.80 | 88.50 |
| 0 | Yellowness | | 1.38 | 1.38 | 1.41 | 1.43 |
| 1000 | Yellowness | | 1.46 | 1.41 | 1.45 | 1.49 |
| 2000 | Yellowness | | 1.61 | 1.53 | 1.56 | 1.82 |
| 0 | Haze | % | 0.37 | 0.35 | 0.32 | 0.45– |
| 1000 | Haze | % | 0.43 | 0.38 | 0.34 | 0.73 |
| 2000 | Haze | % | 0.54 | 0.42 | 0.38 | 0.96 |

From Table 3 it is seen that the transmission was within a very good range of above 92% for all of the tests. An absolutely unexpected feature of the method of the invention is that the transmission after weathering in fact becomes even better (see also tables 4 and 5 below). In other words, weathering does not cause the coating to deteriorate, as is the case with prior-art coatings, but instead causes it to become better. This is a significant and unforeseeable technical advance over processes and products of the prior art.

It is also seen that the yellownesses and the haze at contact temperatures between 80 and 100° C. are outstanding even after 3000 hours of weathering. As the contact temperature goes up, there are improvements in both parameters. It was also found, however, that at excessive contact temperatures (not shown in the tables), the adhesion of the sacrificial film was too strong or the sacrificial film could no longer be removed. With regard to the power of the UV lamp, it emerged that an increased power had a slightly positive effect on yellowness.

With regard to the adhesion, comparative tests C1, C2 and C3 in comparison to inventive tests I1 to I6 show that contact temperatures which are too low, even when the incipient dissolution times are very long (see C3), can lead to inadequate adhesion. C4 shows that contact temperatures which are too high are likewise negative for haze and yellowness after prolonged weathering.

A comparison of Tables 3 and 4 shows that increasing the incipient dissolution time leads to significantly better transmissions, yellownesses and haze. The adhesion is improved as well. If the selected incipient dissolution time is too long (not shown in the tables), however, then optical defect sites develop and the haze is poorer.

In accordance with Table 5, similar effects are evident for polycarbonate substrates as for PMMA.

Example 3

Figure 3:
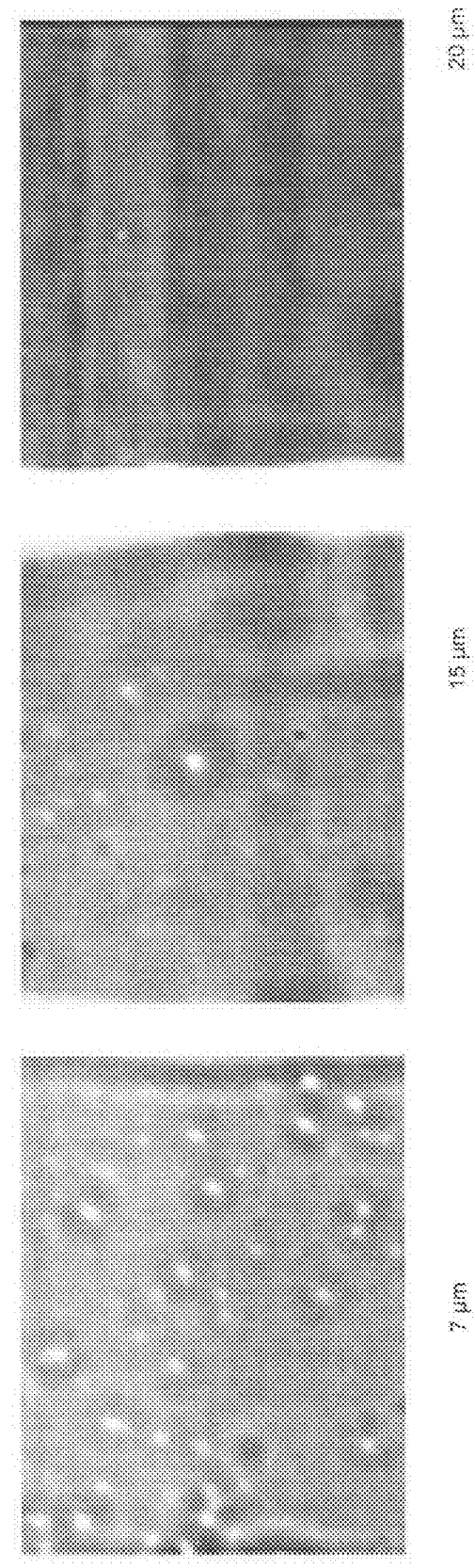
FIG. 3 shows three substrates having a coating material on each substrate, where the thicknesses of the coating material are 7 μm, 15 μm, and 20 μm.

On a substrate according to Example 2, a coating material according to Example 2 was applied in different layer thicknesses. It became apparent that numerous optical defects in the outer layer, as a result of extraneous particles, were found with a layer thickness of 7 µm. At layer thicknesses of 15 µm and especially 20 µm, surfaces with very good to outstanding quality were obtained; see FIG. 3.

Example 4

Performance investigations described below were carried out on the composite materials of the invention:

A 2 mm thick PMMA sheet coated by the method of the invention, with a scratch-resistant and abrasion-resistant coating having a Taber value of <3% in accordance with ASTM D1044, was subjected to a thermal bending test (forming by an angle of) 90°, in which it was found that this sheet could be bent with a radius of 20 mm without cracks occurring. The composite materials of the invention can therefore be bent with significantly smaller radii than sheets coated by conventional methods. This is evidence of the particularly good connection between substrate and coating. In a number of tests it was confirmed that no cracks occurred at bending radii of sheet thickness×10.

In a processing test it was found that the composite materials of the invention can be laser-treated, sawn, polished and drilled to very good effect.

Advances were obtained in relation to the fire performance as well—accordingly, it was possible to delay significantly the ignition of the composite materials of the invention, in comparison with the pure PMMA substrate.

LIST OF REFERENCE NUMERALS

1 Extruder
2 Extruder polishing unit (rollers and rolls)
3 Substrate
4 Heating means, e.g. radiant IR lamp
5 Surface cleaning means
6 Outer film
7 Outer film reservoir
8 Conveying and deflecting rollers or cleaning means for outer film or adhesive rolls
9 Metering means for the coating material or adhesive
10 Contact temperature measurement point
11 Laminator or pressure application rolls
12 Composite material
13 $1^{st}$ UV source
14 Outer film receiver
15 Removal of outer film from coated substrate
16 $2^{nd}$ UV source
17 Quality control facility
18 Protective film reservoir
19 Pressure application rolls
20 End product

The invention claimed is:

1. A method for continuous inline production of a coated polymeric substrate or laminate,
the method comprising:
a. contacting a substrate made of a polymeric material with a curable coating material or adhesive;
b. lining the coating material or adhesive with an outer film; and
c. curing the coating material or adhesive,
wherein
the curing takes place in at least two curing steps, in which a first curing step is a thermal or a radiation curing step, and a subsequent curing step is a radiation curing step,
wherein either the first curing step has delayed initiation, in which an incipient dissolution time is at least 10 s, or
a spontaneous thermal initiation of curing on first contact between coating material or adhesive takes place, and consequently the first curing step begins,
and wherein a monomer mixture of the coating material or adhesive, method conditions, or both,
are selected to obtain a mixed phase of coating material or adhesive and dissolved substrate polymer, in which a thickness of the mixed phase is between 90% and 1% of a total layer thickness of an outer layer or adhesive layer.

2. The method according to claim 1,
wherein
the coating material or adhesive comprises at least two photoinitiators which are activatable at different wavelengths,
the coating material or adhesive comprises a thermally activatable initiator and a photoinitiator,
the coating material layer or adhesive layer has a layer thickness, measured 20 cm after a laminator gap, of more than 3 μm,
the coating material has a dynamic viscosity in the range from 50 to 10,000 mPa*s at 25° C.
the adhesive has a dynamic viscosity preferably in the range from 100 to 20,000 mPa*s at 25° C., or any combination thereof.

3. The method according to claim 2,
wherein
the coating material layer or adhesive layer has a layer thickness, measured 20 cm after a laminator gap, of from 5 to 100 μm.

4. The method according to claim 2,
wherein
the coating material layer or adhesive layer has a layer thickness, measured 20 cm after a laminator gap, of from 5 to 80 μm.

5. The method according to claim 2,
wherein
the coating material layer or adhesive layer has a layer thickness, measured 20 cm after a laminator gap, of from 7 to 70 μm.

6. The method according to claim 2,
wherein
the coating material layer or adhesive layer has a layer thickness, measured 20 cm after a laminator gap, of from 10 to 60 μm.

7. The method according to claim 2,
wherein
the coating material layer or adhesive layer has a layer thickness, measured 20 cm after a laminator gap, of from 10 to 40 μm.

8. The method according to claim 1,
wherein the substrate polymer is selected from the group consisting of a PMMA-based polymer, a polycarbonate-based polymer, a styrene-acrylonitrile-based copolymer, and a polyvinyl chloride-based polymer, and
contact temperatures of the substrate for the respective substrate polymers are from 70 to 100° C., from 80 to 130° C., from 65 to 110° C., and from 60 to 100° C.

9. The method according to claim 8,
wherein
incipient dissolution time for the respective substrate polymers are from 15 to 240 s, from 15 to 240 s, from 15 to 240 s, and from 15 to 200 s.

10. The method according to claim 9,
wherein
the incipient dissolution time is controlled by a conveying speed of the substrate or by a positioning of a $1^{st}$ radiation source,
the conveying speed of the substrate is within the range from 0.1 to 10 m/min, or both.

11. The method according to claim 8,
wherein
the substrate in the contacting a) is attained by extrusion of a moulding composition or by a continuous cast polymerization,
the substrate, prior to first contact with the coating material or adhesive, is heated by a suitable heating means, to attain the contact temperature,
a surface of the substrate, outer film, or both, facing the coating material or adhesive, prior to first contact with the coating material or adhesive is cleaned,
either
    the coating material or adhesive is first applied to the outer film and then brought into communication with the substrate,
    the coating material or adhesive is first applied to the substrate and then covered with the outer film, or
    the coating material or adhesive is first applied both to the substrate and to the outer film and then the two are brought together,
after the substrate, coating material and outer film have been brought together for the first time, a resulting composite is compressed in a laminator or between nip rolls,
a sacrificial film is an outer film, which is removed after the first curing c) or a further curing d),
an inline optical quality control e) is carried out after the first c) or further curing d) ends,
depending whether the outer film is removed or a laminate is produced, after the end of the first curing c), the first c) and further curing d), the first curing c) and the quality control e), or the first c) and further curing d) and quality control e), a surface of a resulting product is coated with a removable protective film f),
and
the contacting b) to the first curing c), the contacting a) to the further curing d), or the contacting a) to the quality control e) are carried out under clean-room conditions, controlled-climate conditions, or both.

12. The method according to claim 1,
wherein
when a sacrificial film is an outer film, a radiation curing step, takes place through the sacrificial film, the substrate, or both, and a further radiation curing step, takes place after removal of the sacrificial film.

13. The method according to claim 1,
comprising
at least two radiation curing steps.

14. The method according to claim 1,
wherein
the substrate is at least one thermoplastic polymer selected from the group consisting of polymethyl methacrylate, poly(meth)acrylimide, polyacrylonitrile, polystyrene, polyether, polyester, polycarbonate, polyvinyl chloride, styrene-acrylonitrile copolymer, acrylonitrile-styrene-butadiene copolymer, styrene-maleic acid copolymer, (meth)acrylate-styrene-maleic anhydride copolymer and polymethyl methacrylate copolymer,
the substrate has a thickness in the range from 10 μm to 500 mm or both.

* * * * *